(No Model.)
L. H. SOLON & J. McMAHON.
MACHINE FOR WEIGHING GRAIN.
No. 385,532. Patented July 3, 1888.
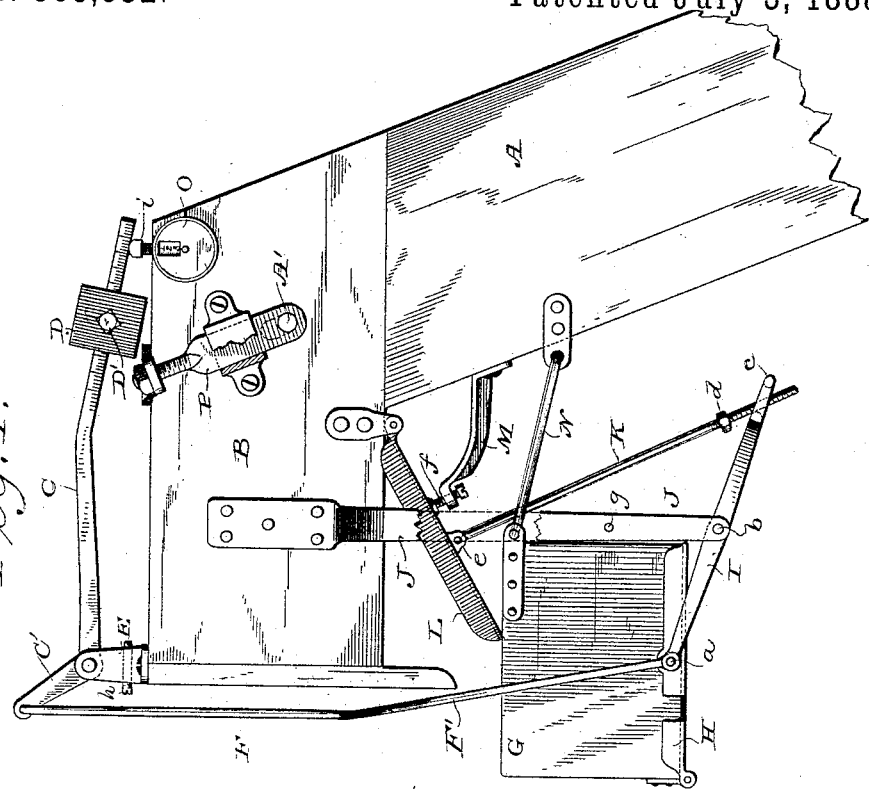
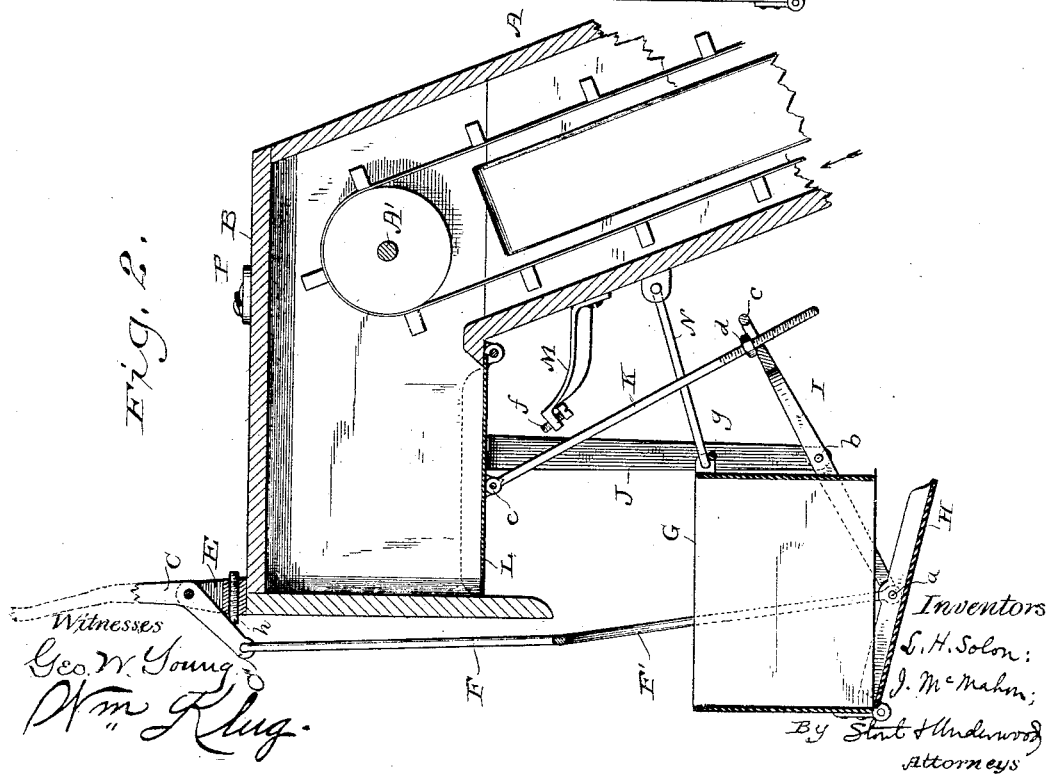
Witnesses
Geo. W. Young
Wm Klug
Inventors
L. H. Solon
J. McMahon
By Stout & Underwood
Attorneys

UNITED STATES PATENT OFFICE.

LOUIS HENRY SOLON AND JOHN McMAHON, OF MENDOTA, ILLINOIS.

MACHINE FOR WEIGHING GRAIN.

SPECIFICATION forming part of Letters Patent No. 385,532, dated July 3, 1888.

Application filed March 6, 1888. Serial No. 266,297. (No model.)

*To all whom it may concern:*

Be it known that we, LOUIS HENRY SOLON and JOHN McMAHON, of Mendota, in the county of La Salle, and in the State of Illinois, have invented certain new and useful Improvements in Devices for Weighing or Measuring Grain; and we do hereby declare that the following is a full, clear, and exact description thereof.

Our invention relates to the weighing or measuring of grain from a thrashing-machine as it comes from the elevator and is conveyed to a wagon or other suitable receptacle; and it consists in certain peculiarities of construction, as will be fully set forth hereinafter and pointed out in the claims.

In the drawings, Figure 1 is a side elevation of our said device, partly broken away to better show the construction and with the bottom of the measure closed; and Fig. 2 is a vertical central section of the same with the bottom of the measure open.

A is the elevator, of ordinary construction, and B the head of the same.

C is a scale beam or lever, which is balanced directly over the head of the elevator, with a movable weight, D, (held at any desired adjustment by the set-screw D',) for the different kinds of grain, and said scale-beam is pivoted between the arms of a lug, E, on the front end of the elevator-head, while from the short arm C' of this scale-beam is suspended the bail F F' F' of the hinged bottom H of the measure G. Secured to the pintles $a$ of the said bail-arms F' on the said hinged bottom are the arms I of another bail, which arms are themselves provided with pintles $b$, by which they are pivoted to vertical straps J, depending from the elevator-head B, and the bail I ends in a loop or eye, $c$, which receives the lower end of a rod, K, (said end being preferably screw-threaded and fitted with a nut or with a collar, $d$,) the upper end of this rod K being hinged to a lug, $e$, on the under side of the hinged cut-off L, which closes the bottom of the elevator-head, and which, when dropped, bears against a stop, $f$, in an arm or bracket, M, projecting from the elevator A.

The measure G is connected to the elevator A by means of links N, while a cross-rod, $g$, extending from one strap J to the other, prevents the measure from dropping too far down by coming in contact with said links N, as shown in Fig. 2. A set-screw, $h$, projecting from lug E prevents the scale-beam C from going beyond its center of gravity when raised, and when the said beam C falls in the operation of our device its free end strikes the transverse arm $i$ of a register, O, which latter may be of any approved pattern, so as to register the quantity of grain thrashed as fast as it is measured or weighed.

P represents ordinary tightening devices secured to the journals A' of the elevators in the usual manner.

The operation of our device will be apparent from the foregoing description of its construction. As the grain is elevated (which is done on the side nearest the measure, as indicated by the arrow in Fig. 2) it falls on the cut-off L, and as it accumulates the weight of it opens said cut-off, which forms a spout leading to the measure G, and this downward movement of said cut-off depresses its hinged rod K and the free end $c$ of the bail I, thereby raising the pivoted ends of the arms of said bail I, and with them the bottom H of the measure, the scale-beam C falling at the same time and its free end striking the transverse arm $i$ of the register O and registering one measure full of grain. The moment the measure gets its proper weight it overcomes the weight D on the scale-beam, and the latter begins to rise and the measure G to descend until its links N strike the cross-bar $g$, the downward movement of the measure serving, by the described connection of parts the moment its bottom H opens, to raise (through bail I $c$ and rod K) and close the cut-off L, the bottom opening when the cross-rod $g$ is reached, as described, and the scale-beam C raised to about a vertical position, when the grain is dumped from the measure, sliding off the open inclined bottom H into any suitable receptacle, and then the action just described is repeated.

The great advantage of our device is that its action is entirely automatic, and neither the cut-off nor grain-measure bottom has to be provided with any hook, catch, latch, or trip; but one of these parts regulates the closing and opening of the other at the proper times in regular alternation, thus assuring accuracy of action, combined with great simplicity of construction.

Having thus fully described our invention, what we claim as new, and desire to secure by Letters Patent, is—

1. In a device for automatically weighing or measuring grain, the combination of an elevator and measure with a cut-off and a rod directly pivoted thereto, and a bail pivoted on a fixed support and connecting said rod and the hinged bottom of the measure, whereby said cut-off is closed by the downward weight of the measure and opened by the weight of grain accumulating thereon while the measure is dumping.

2. In a device for automatically weighing or measuring grain, the combination of an elevator and a cut-off hinged to the head thereof, a weighted scale-beam pivoted to said head, a measure connected by links to the elevator and having a pivoted bottom attached by a bail to the said scale-beam and by another bail to straps depending from the elevator-head, said straps being connected by a cross-rod below the line of the said links, and a rod hinged to the bottom of the cut-off and having a nut or collar bearing upon the end of the last-named bail, all combined and adapted to operate as hereinbefore set forth.

In testimony that we claim the foregoing we have hereunto set our hands, at Mendota, in the county of La Salle and State of Illinois, in the presence of two witnesses.

LOUIS HENRY SOLON.
JOHN McMAHON.

Witnesses:
GEO. L. LAUTERBACH,
JOHN GOEDTNER.